United States Patent [19]

Parker

[11] Patent Number: 4,973,371
[45] Date of Patent: Nov. 27, 1990

[54] METHOD FOR FORMING FOAMED PARTS AND A MULTIPLE LAYER RELEASE ADHESION PAPER THEREFOR

[75] Inventor: Kent Parker, Barrington, N.H.

[73] Assignee: Davidson Textron Inc., Dover, N.H.

[21] Appl. No.: 225,364

[22] Filed: Jul. 28, 1988

[51] Int. Cl.$^5$ ............................................. B32B 31/12
[52] U.S. Cl. ...................... 156/79; 156/245; 156/249; 264/46.5; 264/46.6; 428/31; 428/40
[58] Field of Search ............... 156/78, 79, 245, 249, 156/323; 264/46.5, 46.6; 428/31, 40

[56] References Cited

U.S. PATENT DOCUMENTS

| | | |
|---|---|---|
| 2,956,310 | 10/1960 | Roop et al. |
| 3,533,899 | 10/1970 | Kapral. |
| 3,787,546 | 1/1974 | Pratt et al. ........................... 156/242 |
| 3,895,154 | 7/1975 | Kapral ................................. 428/153 |
| 4,165,999 | 8/1979 | Egner .................................. 156/245 |
| 4,207,017 | 5/1980 | Hefele ................................. 428/160 |
| 4,546,022 | 10/1985 | Madonia et al. ...................... 428/40 |
| 4,673,542 | 6/1987 | Wigner et al. ....................... 264/275 |

Primary Examiner—David Simmons
Assistant Examiner—James J. Engel, Jr.
Attorney, Agent, or Firm—John C. Evans

[57] ABSTRACT

A process for molding foam products from foam precursors reacted in a mold cavity formed in part by a mold lid and which is covered by a double layer cover to maintain the surface of the lid clean during the foaming process comprising the steps of: providing a double layered cover having four working surfaces; adhering one of the working surfaces to the lid and thereafter closing the tool lid and foaming the part. The lid is opened and the cover and foam part are separated from the mold. The lid is separated from the double layer cover and foam part at a working surface of low strength adhesive; a release sheet of the cover is separated at two other working surfaces to expose a high strength adhesive for connecting the foam part to another member. The double layer cover used for practicing the process includes a foam layer adapted to have one surface thereof bonded to foam material and including a high strength adhesive backing thereon. A release sheet layer is formed on the high strength adhesive and remains thereon until a foam part is separated from the mold. The release sheet further includes a low strength adhesive on the exposed surface thereof which is adapted to be connected to the mold lid to prevent foam material build up without use of release agent coatings.

5 Claims, 2 Drawing Sheets

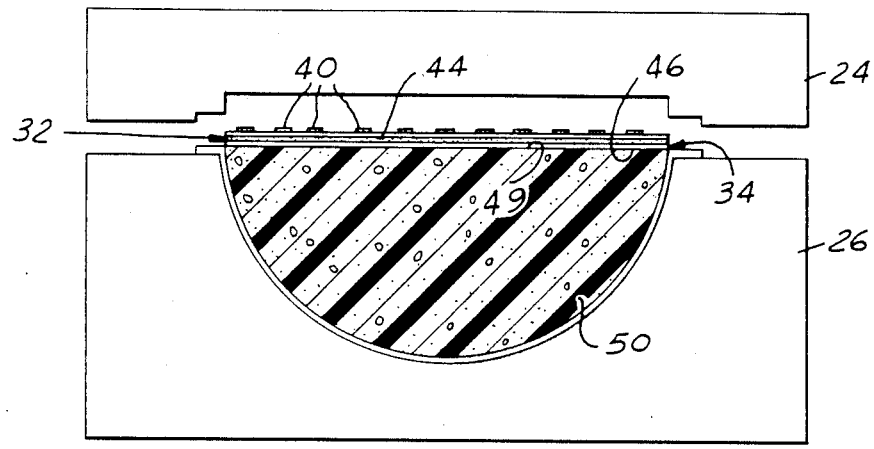
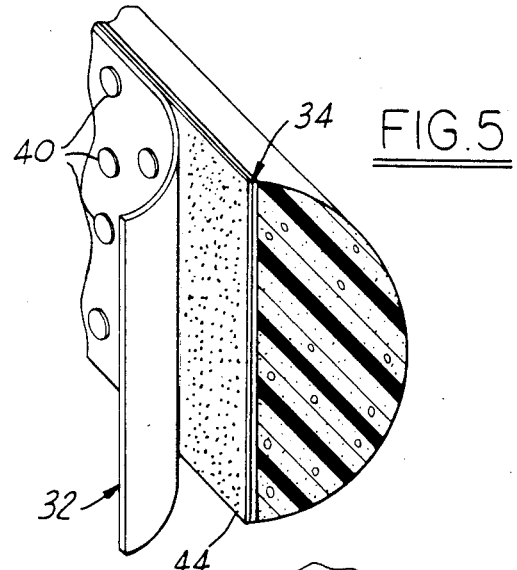
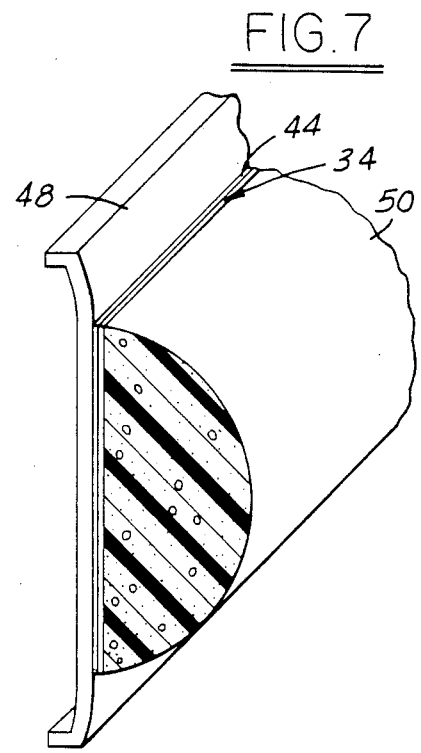
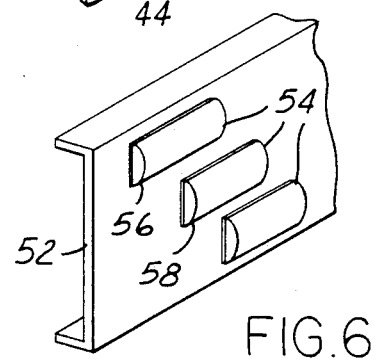
FIG. 4
FIG. 5
FIG. 7
FIG. 6

METHOD FOR FORMING FOAMED PARTS AND A MULTIPLE LAYER RELEASE ADHESION PAPER THEREFOR

BACKGROUND OF THE INVENTION

This invention relates to foam molding processes and more particularly to foam molding processes in which mold release agents are provided on a mold lid to prevent the foam material from adhering thereto.

It is known to provide various forms of mold release material either on a mold lid surface or in the foam precursors to aid in the separation of a mold part from the mold lid on completion of a molding sequence.

Also various proposals are known in which molded parts have a preformed adhesive layer to permit post adhesion to another component.

The problem with wax release or foam precursor release system is that they require use of expensive release chemicals in the production process. Further, use of wax release agents can cause wax contamination of a subsequent paint process. Such contamination can result in poor adhesion of paint coatings on the foamed part.

Another problem with release systems is that the release chemicals can cause poor foam adhesion to vinyl shells contaminated by such chemicals.

U.S. Pat. No. 2,956,310 discloses a method for casting cellular resin sheets by use of cover films that are later stripped away. The strips are provided only to aid in the foaming process and are not suggested for use in a mold release system or for use in forming a post adhesive surface on a foam part.

U.S. Pat. No. 3,787,546 discloses the use of a layer of release material to provide release of a polymer composite from a mold surface. The process has the release agent contamination problem set-forth above.

U.S. Pat. No. 3,895,154 discloses a sheet of material to cover the mold cover. The sheet is coated with the silicon material and is configured to allow for escape of gas from the mold reactants. It does not provide a system for concurrently releasing a part from the mold while providing a post adhesion surface on the part.

U.S. Pat. No. 4,165,999 discloses a mold process for the manufacture of cement or gypsum products. The mold surfaces are covered by a layer of thermoplastic material which prevents water evaporation. Their is no suggestion of a system which eliminates the use of release agents in a foam molding process while providing for post adhesion of the foam part to another part.

Proposals for providing a separate adhesive layer on a various parts some including foam parts are shown in U.S. Pat. Nos. 4,590,112; 4,204,017; 3,533,899. Such adhesive layers are not formed as part of a mold release process used for the manufacture of foam parts.

SUMMARY OF THE INVENTION

An object of the present invention is to provide an improved process for manufacturing foam parts which will eliminate the need for mold lid release chemicals and which will concurrently provide a post adhesion surface on the mold part.

A feature of the invention is to provide a process of the type set-forth in the preceding object wherein a lid is covered with a double layer paper having four working surfaces; foam is reacted against one of the working surfaces to bond a foamed part to the double layer paper; another of the working surfaces is adhered against the lid with a adherent force that will allow separation of the foam part from the mold cavity when the lid is opened; then the foam part and double layer paper is stripped from the lid to form a surface on the lid cleaned for subsequent molding processes.

Another feature of the invention is to provide a process of the type set-forth in the preceding objects and features in which the double layer paper is separated at the third and fourth working surfaces following separation of the paper from the lid to dispose of one of the layer of paper; and thereafter the fourth working surface is adhered to a substrate member for reinforcing the foamed part.

A further feature of the present invention is to provide a process for forming two tone color parts by post adhering a foamed part of one color to a part of a second color wherein the first foamed part is formed by reacting foam precursors in a mold cavity formed in part by a removable lid covered by the mold paper process set forth above and wherein, the foamed part is connected to the surface of a part having a contrasting color by adhering the third working surface thereto.

Another feature of the present invention is to provide a process for forming a decorative foam in place applique on a polymeric surfaces of a interior vehicular component by the mold paper process set forth above and wherein the applique is formed by reacting foam precursors in a mold cavity closed by a lid covered by cover paper and thereafter post adhering the third working surface to a polymeric surface of an interior component to form a decorative applique thereon.

Still another feature of the present invention is to provide a process for molding a composite foam part having a shell exterior and a foam interior comprising the steps of: providing a preformed shell; locating the preformed shell in a mold cavity and covering the mold lid with a double layer cover having four working surfaces; closing the mold and directing foam precursors therein to form a foam part; bonding the foam part to one layer of the cover at one of the working surfaces thereon; releasing the double layer cover from the lid at a second of the working surfaces to separate the lid from the foam part and the double layer cover bonded transferring the double layer cover and foam part bonded thereto as a unit to an assembly area; and peeling one of the double layers from the other of the double layers to expose a third working surface and adhering the third working surface to another component to bond the other of the double layers and the foam part as a unit to the another component.

Another object of the present invention is to provide a multiple-layered release/adhesion sheet system for practicing the aforesaid processes wherein the sheet system includes a double layer cover with four working surfaces. Two of the working surfaces are located on a cover or release sheet which is adapted to be placed against a pour tool lid. The cover sheet takes the place of release chemicals and is configured to be stripped from the mold lid on completion of the mold sequence to keep the lid clean. The cover sheet also serves as a temporary protective coating for a working surface on a barrier sheet which defines a post adhesive surface.

A further object of the present invention is to provide such a double layer cover wherein one of the working surfaces on the cover sheet has small localized spots of a weak adhering agent for temporary connection of the cover or release sheet on the cover and wherein the localized adhesive is easily separated from the mold lid on completion of the mold process without contaminating the mold lid.

Still another object of the present invention is to provide a double layer cover of either of the preceding objects wherein a release surface on the cover sheet is juxtaposed with a working surface which have an adhesive-coated surface that eventually provides a mechanical attachment of the foam part to another component or main component to which the foam part is assembled.

Yet another object of the present invention is to provide such a double layer cover in which the barrier layer has a working surface which comes in contact with the urethane foam precursors during the foam process and which is treated with an adhesive promoter to create a high strength functional bond of the barrier sheet to the foam part so as to assure that the double layer cover will remain connected thereto during post mold handling and post mold adhesion of the foam part to another component.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 4 is a diagrammatic view of the mold tool with the mold tool lid released from the double layer cover;

FIG. 5 is a perspective view of a foam part conditioned for post adhesion;

FIG. 6 is a perspective view of a post adhered foamed part; and

FIG. 7 is a perspective view of another embodiment of a post adhered foam part.

DETAILED DESCRIPTION OF PREFERRED EMBODIMENTS

Figure 1:
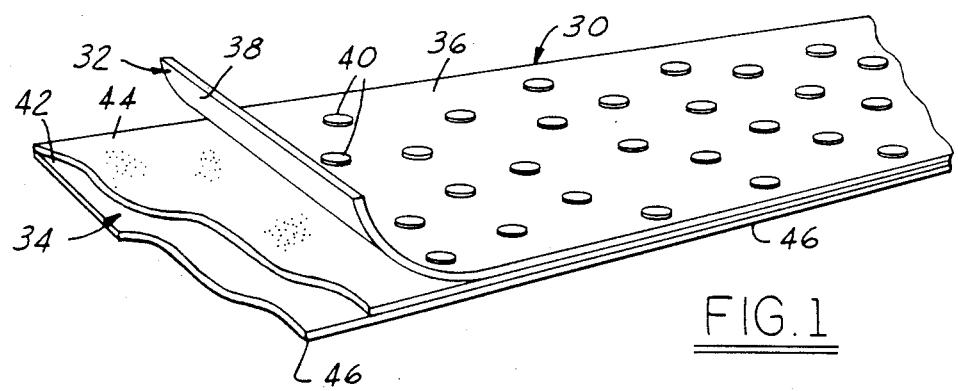
FIG. 1 is a perspective view of a double layer cover according to the resent invention.

Referring now to FIG. 1 the process of the present invention is shown in flow chart form as including the steps of preforming 10 a double layer mold lid cover with four working surfaces; weakly adhering 12 the double layer cover to the mold lid at a first working surface having a weak adhesive agent thereon; closing the mold 14 with foam precursors therein; reacting the foam precursors 16 in the mold; opening the tool lid and releasing 18 the first working surface therefrom; subsequently separating the cover sheet 20 and post adhering 22 the barrier sheet to another component.

Figure 3:
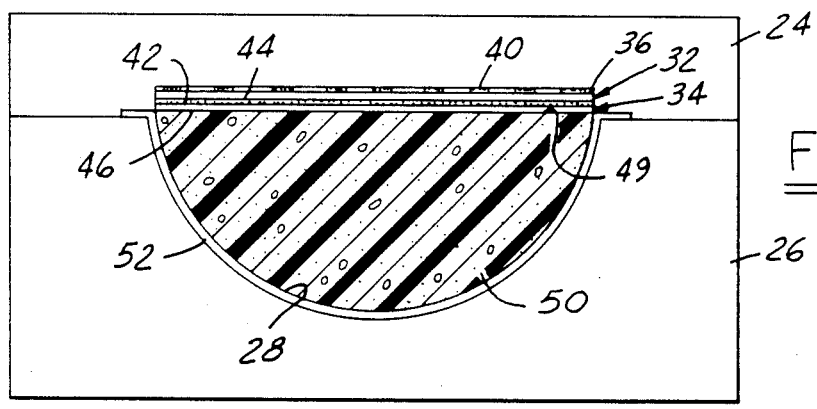
FIG. 3 is a diagrammatic view of a mold tool lid covered by the double layer cover of FIG. 1 bonded to a foam part.

For purposes of describing the invention representative mold tooling is shown in FIGS. 3-5 as a mold assembly for processing foam parts. In addition to the mold tool lid 24 the assembly includes a mold cavity part 26 with a cavity 28 into which foam precursors are directed following which the lid 24 is closed. In other cases the mold lid can be closed and the precursors can be directed through a fill opening of a known type. The mold configuration and fill system for the foam precursors can take the shape and be comprised of components selected to form a particular foam part of a particular polymeric composition none of which require description for an understanding of the present invention, the process of which is adaptable to any polymeric mold process and the article of which is suitable for use in covering the lid of any mold apparatus to keep it clean during the mold process.

The mold process especially benefited by the invention, however, is one in which the foam is a microcellular polyurethane foam prepared by reacting polyol material and isocyanate material in the presence of a suitable catalyst to form a foam part. Heretofore such processes have required coating the mold lid with release agents or have required mixing release agents with the foam precursors to assure ready separation of the mold lid from the foam part formed from the reacted precursors.

Figure 2:
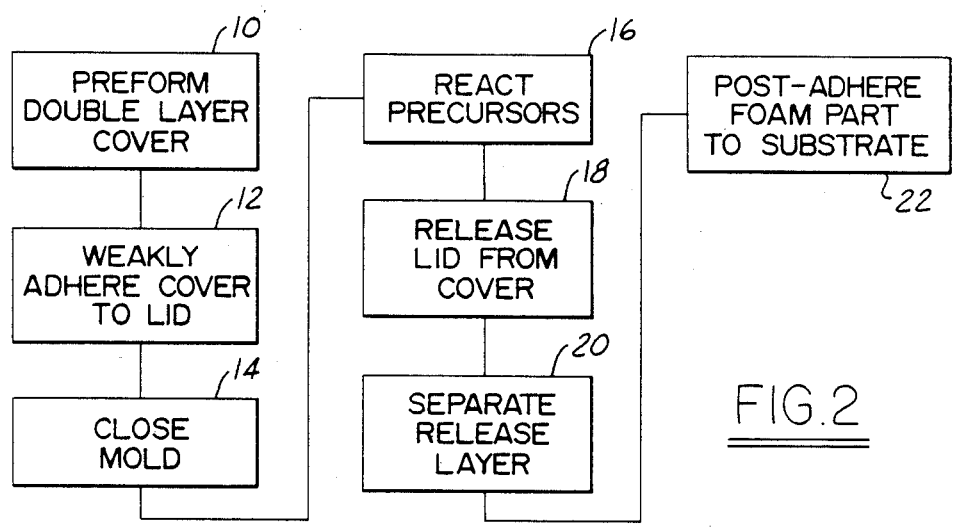
FIG. 2 is a chart of the process of the present invention.

FIG. 1 shows a double layer cover 30 made in accordance with the present invention which is suitable for practicing the process of FIG. 2.

The cover 30 includes a release or cover sheet 32 and a barrier or foam sheet 34. The sheet 32,34 combine to define four working surfaces 36, 38, 42, 46.

Surfaces 36, 38 are located on the cover sheet 32 and are configured to cause the cover sheet 30 to be selectively released from the mold tool apparatus and the foam sheet 34. More particularly, the surface 30 has small, localized "spots" of adhesive commonly known as "holding adhesives" or pressure sensitive adhesives. These adhesives are usually a rubber based elastomer with a liquid or solid resin tackifier component. The agent is spread across surface 36 to define a temporary mounting and positioning of the release sheet on a mold tool lid 4 as shown in FIG. 3.

The adhesive spots 40 define a weak adhesion of the double layer cover 30 to the lid 24 so that the lid surface will be fully covered during the foam process. The adhesive however is composed of material that has a failure strength range such that the adhesive will hold the paper's weight in place, but not the weight of a final foamed part when the reaction of the foam precursors is completed. The adhesive spots 40 are also configured and have a composition which will cause the lid cover to remain essentially clean on the completion of each mold sequence.

Surface 38 of the cover sheet 32 is disposed against the working surface 42 of the foam sheet 34 and will engage a high strength adhesive layer 44 thereon to protect it prior to the post adhesion step of the aforedescribed process of the present invention.

In accordance with certain principles of our invention the foam sheet 34 has working surfaces 42, 46 which are placed toward the pour tool cavity 28 when the double layer cover 30 covers the lid 24. Thus the foam sheet 34 is located against the foam part formed during the foaming process. The foam sheet 34 serves as a permanent backing for the foam part and provides for quick one-step post adhesion of the foam part to another component, e.g. a reinforcing substrate 48 as shown in FIG. 7 or a vinyl substrate having a different color to form a two tone decorative feature on a part such as a vehicle interior component. Still another illustrative use for the product would be to form the foam part as a decorative feature having a foamed in place cloth applique or a foam in place nameplate which is quickly adhered to a vinyl or other composition vehicle interior or exterior component.

More specifically, to accomplish the post adhesion step 22 of our invention the adhesive layer 44 serves as the sole element for mechanically adhering the foam part to another component Adhesive systems suitable for use in the layer 44 include, but are not limited to the following:

Pressure-sensitive adhesives such as rubber-based, acrylic-based and silicone adhesives. Structural forms of acrylic-based adhesives would be especially suitable for forming a mechanical interface to prevent separation from substrates which serve to connect the foam part to a frame system such as connection of a foamed arm rest to a vehicle door.

Film adhesives of a form which can be die cut into complicated shapes to ensure full surface precision bonding between the foam part and a complex surface of a component to which is post adhered.

Mastics to provide flexible joint connects or if desired very stiff or rigid joint connections between the foam part and the connected components.

A working surface 46 on the foam sheet 34 comes in contact with the surface 49 of the foam part 50 as shown in FIG. 3. The surface 46, if desired, can be treated with an adhesive-promoter to produce a functional high strength bond that will assure against separation of the foam part from a connected component such as the substrate 48 shown in FIG. 7. The high strength bond between surface 49 and foam sheet 34 is greater than the weak bond between the cover sheet 32 and the lid 24 so as to permit ready separation of the lid 24 from the foam part.

INDUSTRIAL APPLICABILITY

As shown in FIG. 5, the cover sheet 32 can serve as a protector for the adhesive layer 44 on the foamed part as it is moved from the mold tooling to an assembly area. Thus the foam part will arrive clean and can be quickly connected to another component merely by removing the cover sheet 32 and placing the combined foam sheet 34 and mold part 50 to a prepared surface on the other component. As discussed, the mold part can be formed of one color and can be adhered to a vehicle interior part to form a two tone part without the need for separate painting or masking systems. The mold part can be a decorative applique or a name plate which can be connected without use of secondary fasteners. The mold part can be a foamed part with a shell of the type shown at 52 in FIG. 3 which is preloaded into the mold tooling to form an outer skin on the mold part. The shell is foamed and then is ready for connection to a substrate such as the structural insert used in arm rests or other vehicle interior parts merely by stripping the cover sheet 32 from the foam sheet 34 and applying the adhesive layer 44 on the foam sheet 34 to the insert.

FIG. 6 shows a part such as a rigid substrate 52 of one color with foam buns 54 with either cloth 56 or vinyl coverings 58 post adhered to the substrate 52. The buns 54 can be shaped as desired to form a variety of decorative appearances.

What is claimed is:

1. A process for forming a composite part including covering a foam mold lid to prevent foam material from adhering thereto when foam precursors are reacted in a foam pour tool having a lid and a mold cavity part comprising the steps of:

providing a mold having a lid with a clean inboard surface and a mold cavity part movable between open and closed positions to define a mold cavity into which foam precursors are reacted to form a foam part;

providing a double layer lid cover having a release layer and a barrier layer each sized to completely cover the clean inboard surface of the lid and further providing first and second surfaces on the release layer and third and fourth surfaces on the barrier layer;

providing a first adhesive layer on the first surface adapted to connect to the clean inboard surface of the lid for holding the double layer lid cover thereon when the mold is closed during the molding of the foam part;

providing a second adhesive layer on the third surface covered by the release layer to prevent adhesion of the barrier layer to the lid;

reacting foam in the mold cavity against the fourth surface to bond a foam part to the double layer lid cover;

adhering the first adhesive layer against the clean inboard surface of the lid with an adherent force that will allow separation of the foam part from the lid without removing the foam part from the mold cavity;

separating the lid from the first adhesive layer when the lid is opened following molding of the foam part;

stripping the foam part and double layer lid cover from the mold cavity;

separating the release layer from the barrier layer to expose the second adhesive layer;

thereafter adhering the second adhesive layer to the substrate member for mechanically connecting the foam part thereto.

2. A process for forming two tone color parts including covering a foam mold lid to prevent foam material from adhering thereto when foam precursors are reacted in a foam pour tool including a lid and a mold cavity part relatively movable between open and closed positions and adhering a foam part of one color to a part of a second color wherein the first foam part is formed by reacting foam precursors in a mold cavity formed in part by a removable lid covered by a double layer lid cover comprising the steps of:

providing a mold having a lid with a clean inboard surface and a mold cavity part movable between open and closed positions to define a mold cavity into which foam precursors are reacted to form a foam part;

providing a double layer lid cover having a release layer and a barrier layer each sized to completely cover the surface of the lid and further providing first and second surfaces on the release layer and third and fourth surfaces on the barrier layer;

providing a first adhesive layer on the first surface adapted to connect to the clean inboard surface of the lid for holding the double layer lid cover thereon when the mold is closed during the molding of the foam molded part;

providing a second adhesive layer on the third surface covered by the release layer to prevent adhesion of the barrier layer to the lid;

reacting foam in the mold cavity against the fourth surface to form a solid color foam part bonded the double layer lid cover;

stripping the foam part and double layer lid cover from the lid to expose the clean inboard surface thereon for connection to another double layer lid cover to prevent foam material from adhering thereto when the lid is closed and when foam precursors are reacted in the mold cavity;

separating the release layer from the double layer lid cover at the third and fourth surfaces following separation of the double layer lid cover from the lid;

providing another part of a color contrast to the color of the foam part; and connecting the foam part to the surface of the another part having a contrasting color by adhering the second adhesive layer to the another part.

3. A process for forming a decorative foamed in place applique on another component wherein the applique is formed by reacting foam precursors in a mold cavity closed by a lid having an inboard surface which is adapted to be covered by a double layer lid cover to prevent foam material from adhering to the lid when foam precursors are in the mold cavity comprising the steps of:

providing a mold having a lid with a clean inboard surface and a mold cavity part movable between open and closed positions to define a mold cavity into which foam precursors are reacted to form a decorative applique foam part;

providing a double layer lid cover having a release layer and a barrier layer each sized to completely cover the surface of the lid and further providing first and second surfaces on the release layer and third and fourth surfaces on the barrier layer;

providing a first adhesive layer on the first surface adapted to connect to the clean inboard surface of the lid for holding the double layer lid cover thereon when the mold is closed during the molding of the decorative applique foam part;

providing a second adhesive layer on the third surface covered by the release layer to prevent adhesion of the barrier layer to the lid;

reacting foam precursors in the mold cavity against the fourth surface to bond a foam part to the double layer lid cover;

stripping the foam part and double layer lid cover from the lid to expose the clean surface thereon for connection to another double layer lid cover to prevent foam material from adhering thereto when the lid is closed and when foam precursors are reacted in the mold cavity;

separating the release layer from said barrier layer of the double layer lid cover at the third and fourth working surfaces so as to expose the second adhesive layer thereon following separation of the double layer lid cover from the lid; and thereafter applying the exposed second adhesive layer to a component to secure the decorative applique thereon.

4. A process for forming an adhesive backed member by use of a foam process for covering a clean inboard surface of the lid of a foam mold to prevent foam material from adhering to the clean inboard surface when foam precursors are reacted in a foam pour tool having a lid and a mold cavity part including a double layer lid cover for the lid comprising the steps of:

providing a mold having a lid having a clean inboard surface and a mold cavity part movable between open and closed positions to define a mold cavity into which foam precursors are reacted to form a foam part;

providing a double layered lid cover having a release layer and a barrier layer each sized to completely cover the clean inboard surface of the lid and further providing first and second surfaces on the release layer and third and fourth surfaces on the barrier layer;

providing a first adhesive layer on the first surface adapted to connect to the clean inboard surface of the lid for holding the double layer lid cover thereon when the mold is closed during the molding of the foam part;

providing a second adhesive layer on the third surface covered by the release layer to prevent adhesion of the barrier layer to the lid;

reacting foam in the mold cavity to bond the foam part to the fourth surface on the barrier layer to bond the foam part to the double layer lid cover;

adhering the first adhesive layer against the clean surface of the lid to produce an adherent force that will allow separation of the lid from the foam part in the mold cavity as the lid is opened and to prevent foam adhering to the lid when foam precursors are reacted in the mold cavity;

lifting the lid from the double layer lid cover and the foam part bonded thereto;

stripping the foam part and the double layer lid cover bonded thereto from the mold cavity part; and separating the release layer of the double layer lid cover at the third and fourth working surfaces following stripping of the foam part from the mold cavity part.

5. A process for molding a composite foam part having a shell exterior and a foam interior comprising the steps of:

providing a mold having a lid with a clean inboard surface and a mold cavity part movable between open and closed positions to define a mold cavity into which foam precursors are reacted to form a foam part;

providing a double layer lid cover having a release layer and a barrier layer each sized to completely cover the clean inboard surface of the lid exposed to the foam material being molded in the mold cavity and further providing first and second surfaces on the release layer and third and fourth surfaces on the barrier layer;

providing a first adhesive layer on the first surface adapted to connect to the clean inboard surface of the lid for holding the double layer lid cover thereon when the mold is closed during the molding of the foam molded part;

providing a second adhesive layer on the third surface covered by the release layer to prevent adhesion thereof of the barrier layer to the lid;

providing a preformed shell;

locating the preformed shell in the mold cavity and connecting the first adhesive layer to the clean surface of the lid to cover the mold lid with a double layer lid cover;

closing the mold lid and directing foam precursors into the mold cavity;

reacting foam in the mold cavity to bond the foam part to the barrier layer at the fourth surface thereon to bond the foam part to the double layer lid cover;

adhering the first adhesive layer working surface against the clean surface of the lid to produce an adherent force that will allow separation of the lid from the foam part in the mold cavity as it the lid is opened while preventing foam adhering to the lid when foam precursors are reacted in the mold cavity;

releasing the double layer lid cover from the clean surface of the lid at the first adhesive layer;

removing the foam part and the double layer lid cover bonded thereto from the mold cavity for transportation to an assembly area;

providing another component;

separating the release layer from the double layer lid cover to expose the second adhesive layer for connection to the another component; and adhering the second adhesive layer to the another component to bond the barrier layer and the foam part as a unit to the another component.

* * * * *